United States Patent
He

(10) Patent No.: US 6,782,312 B2
(45) Date of Patent: Aug. 24, 2004

(54) SITUATION DEPENDENT LATERAL TERRAIN MAPS FOR AVIONICS DISPLAYS

(75) Inventor: Gang He, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/253,340

(22) Filed: Sep. 23, 2002

(65) Prior Publication Data

US 2004/0059473 A1 Mar. 25, 2004

(51) Int. Cl.$^7$ .................................................. G06F 7/00
(52) U.S. Cl. .................................................. 701/3; 701/8
(58) Field of Search ........................... 701/3, 8, 9, 211; 340/970, 977, 995.17, 995.14; 342/65; 345/582

(56) References Cited

U.S. PATENT DOCUMENTS

| | | | | |
|---|---|---|---|---|
| 5,839,080 A | * | 11/1998 | Muller et al. ................. | 701/9 |
| 5,936,552 A | * | 8/1999 | Wichgers et al. ............ | 340/963 |
| 6,092,009 A | * | 7/2000 | Glover ........................ | 701/14 |
| 6,489,916 B2 | * | 12/2002 | Block .......................... | 342/65 |
| 6,606,034 B1 | * | 8/2003 | Muller et al. ............... | 340/970 |
| 2002/0080145 A1 | * | 6/2002 | Ishihara ...................... | 345/589 |
| 2002/0101419 A1 | * | 8/2002 | Cook .......................... | 345/426 |
| 2003/0193411 A1 | * | 10/2003 | Price .......................... | 340/973 |

* cited by examiner

Primary Examiner—Michael J. Zanelli

(57) ABSTRACT

In a lateral terrain map for avionics displays, a terrain relief contrast adjustment parameter, based on a statistical terrain roughness measure, is used to compute optimal terrain presentation for current display conditions. The contrast adjustment parameter allows situation dependent map presentation to enhance, for example, caution and warning situations, or de-emphasize the terrain map features for balanced presentation along with foreground symbology, while reducing computational resource requirements.

12 Claims, 7 Drawing Sheets

SITUATION DEPENDENT LATERAL TERRAIN MAPS FOR AVIONICS DISPLAYS

TECHNICAL FIELD

The present invention relates to a display for a vehicle, and more particularly to a display for an aircraft flight management system that also displays terrain features.

BACKGROUND OF THE INVENTION

Modern map displays, particularly those used in aircraft for flight planning and monitoring, are capable of displaying a considerable amount of information such as flight planning information and terrain information. The terrain information consists of situational awareness (SA) terrain and terrain cautions and warnings that, among other things, may indicate where the aircraft may potentially impact terrain. The flight planning information consists of flight path information, altitude information and other information useful to a pilot or crewmember in following and anticipating the path and altitude of the aircraft over the ground.

A graphic display of a flight path provides better spatial understanding of the planned flight path and therefore reduces the navigational workload for a flight crew. In particular, when an altitude-to-color-coded, relief-shaded terrain representation is used as an underlay for a flight path display, the relative positioning of the flight path to the terrain features can be seen. This aids in detecting potential flight path conflicts with terrain as well as planning for optimal paths around potentially hazardous areas.

It is important, however, that information displayed in integrated displays be properly balanced in order that a flight crew may quickly interpret the contents of the display. Lateral terrain maps are often used as the main background for depicting other navigational and graphical flight planning information. When terrain threats are present, terrain maps highlight the nature and location of the impending threat. In addition, the maps are used for overall situational awareness purposes.

Lateral terrain maps are typically produced by color encoding of altitude and elevation information at discrete regularly spaced locations. Shading techniques may be applied to vary the intensity of the colors in order to model terrain relief features.

However, avionics terrain displays must cover large segments of the world with different scale, resolution, range, and threat handling requirements of multiple tasks, and terrain features are random phenomena. For example, global terrain features from one to 750 nautical miles must be displayed. A fixed terrain shading or feature generation approach may work well in some circumstances but would produce less desirable results in others.

Additionally, system throughput of the computers generating the displays limits the amount of terrain data available to represent features. Complex optical modeling for good visual effects is often computationally prohibitive for on-board real-time systems.

BRIEF SUMMARY OF THE INVENTION

The instant invention addresses the aforementioned difficulties by significantly reducing the computation and data load for producing the flight plan and terrain display for flight management systems. This is accomplished by the use of a terrain relief contrast adjustment parameter, based on a statistical terrain roughness measure, to compute optimal terrain presentation for current display conditions. The contrast adjustment parameter allows situation dependent map presentation to enhance, for example, for caution and warning situations, or de-emphasize the terrain map features for balanced presentation along with foreground symbology

BRIEF DESCRIPTION OF THE DRAWINGS

The present invention will hereinafter be described in conjunction with the appended drawing figures, wherein like numerals denote like elements, and in which.

DETAILED DESCRIPTION OF A PREFERRED EMBODIMENT

Figure 1:
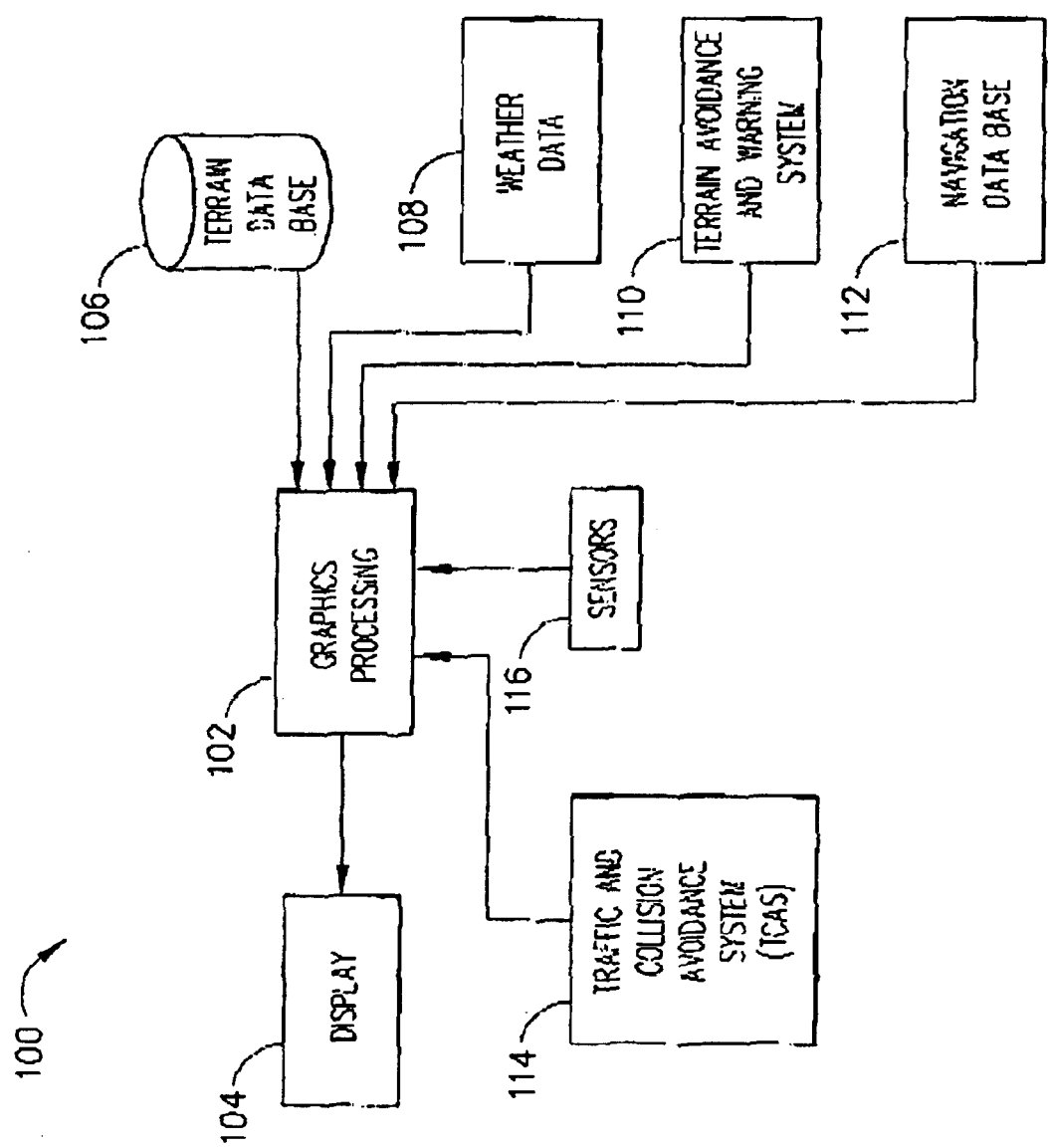
FIG. 1. shows a typical, exemplary flight management display system that may be used with the instant invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed.

It should be appreciated that the particular implementations shown and described herein are illustrative of the invention and its best mode and are not intended to otherwise limit the scope of the invention in any way.

In FIG. 1, an exemplary flight management display system 100 includes a graphics processor 102 configured to provide information to a display element or monitor 104. One or more data sources are coupled to the processor 102. These data sources may be, but are not limited to, a terrain data base 106, weather radar data source 108 from an on-board weather radar unit or from an external weather data source such as a ground-based weather data source or a satellite weather data source, a terrain avoidance and warning system (TAWS) 110, a navigation data base 112, a traffic and collision avoidance system (TCAS) 114 or other sensors 116 which may provide additional useful information to a user.

A number of aspects of display element 104 (which are controlled by processor 102 in a practical embodiment) may contribute to the improved contents and appearance of the display, thus increasing the situational and terrain awareness of the pilot and/or flight crew. The image generation and display aspects may leverage known techniques such that existing display systems can be modified in a straightforward manner to support the different features described herein. In a practical implementation, the concepts described herein may be realized in the form of revised display generation software or processing resident at processor 102.

Processor 102 encompasses one more functional blocks used to provide a flight management, navigational, weather, terrain, and positional interface with the pilot, and input to display element 104. Processor 102 may include or cooperate with a mode, position and/or detection element that is capable of determining the mode or position of the vehicle relative to one or more reference locations, points, planes, or navigation aids. In addition, processor 102 may be configured to receive, analyze, condition, and process navigation and positional information, including flight path information as well as weather information associated with the vehicle. In this regard, processor 102 may include any number of individual microprocessors, flight computers, navigation equipment, memories, storage devices, interface cards, and other standard components known in the art. Moreover, processor 102 may include any number of microprocessor elements, memory elements, power supplies, and other functional components as necessary to support the operation of the display system 100. In this respect, processor 102 may include or cooperate with any number of software programs or instructions designed to carry out various methods, process tasks, calculations, control functions, and the generation of display signals and other data used by display element or monitor 104. For example, processor 102 may be configured to generate an annunciator associated with the position of the aircraft relative to at least one reference location, to generate windows corresponding to user inputs, to combine inputs from various sensors to create a data stream for presentation to the display element 104, and the like.

Processor 102 may also be suitable configured to receive and process navigational data 112 related to an intended flight path and destination of the aircraft. In a practical commercial aircraft application, such navigational data 112 may be associated with specific waypoints, airports, navigational aids, or the like. As described in more detail below, processor 102 may process data from any of the data inputs shown above and generate appropriate signals to display element 104 such that display element 104 generates indicia representative of the appropriate navigational, weather, terrain, or other information, or the like. Such processors and flight control computers are available from a number of manufacturers such as Honeywell International Inc. In an exemplary embodiment, processor 102 is incorporated within a flight management system (FMS) or another avionics component that, inter alia, formats navigation data and forwards the data to monitor 104 for display as data on display 104.

Display element 104 may include any display element suitable for displaying the various symbols and information detailed below. Many currently known monitors are suitable for this task, including various CRT and flat-panel display systems. Display element 104 may be based on a panel mounted display, a HUD projection, or any known technology. In an exemplary embodiment, display element 104 includes a panel display. Display element 104 suitably includes various graphical elements associated with the environment of the aircraft including the location of various navigational aids including VHF Omnirange stations, non-directional beacons, radio stations, and the like, and airports, airways, special use airspace, and other aircraft.

In operation, the graphics processor 102 obtains inertial or other data (position, speed, direction) from the sensors 116. Based on the inertial data, the graphics processor 102 obtains terrain data and navigation data from the data bases 106, 112. These data bases are typically onboard the aircraft, but need not be limited to such a design. The graphics processor 102 renders a picture of the absolute terrain, and the navigation data (VORs, airports, airways, etc) and flight path is also rendered on the display element 104. The TAWS 110 provides data to the graphics processor 102 regarding the location of terrain that may be a threat to the aircraft. The graphics processor 102 may show the potential threat terrain in various colors depending on the level of threat: red for warnings (immediate danger), yellow for cautions (possible danger), and green for terrain that is not a threat Of course, other colors and different numbers of levels of threat can be provided as a matter of choice. Shading approaches may be used to vary the intensity of the colors in order to model terrain relief features.

The graphics processor 102 may also show potential weather threats in various colors depending on the level of threat: red for warnings (immediate danger, perhaps severe thunderstorms), yellow for cautions (possible danger, some weather build-up and/or heavy precipitation), and green for weather that is not a threat Of course, other colors and different numbers of levels of threat can be provided as a matter of choice. Shading approaches may be used to vary the intensity of the colors in order to model weather features.

The terrain is depicted initially as a square patch of terrain having N×N terrain elevation data points which relate to the height at that location above sea level or some other arbitrary elevation reference point. When many of these data are specified, such as a square patch, it may be termed a terrain height field. From a top-down perspective, it appears that these data points are laid out as a square. Terrain elevation data are usually given at discrete, regularly spaced points, say 100 meters apart (or some other appropriate distance, depending on the area to be covered and the detail required). In order to graphically represent the terrain, simple polygons are used to connect the data points to make them appear continuous on a graphic display. The connection of these discrete data points forms a mesh. Triangles may be used to connect the data points. These non-overlapping triangles form a triangle or polygon mesh. Alternatively, quad, octal, or other shapes may be used to connect the data points.

The triangles (as used in this example) of the polygon mesh are further laid out as a triangle binary tree where the large triangles of the polygon mesh are divided into right and left halves, and these resultant triangles are further divided into smaller left and right halves, and so on until the desired degree of resolution is obtained. Because of the tree structure, any triangle can be traced up to the original large triangle. Again, binary trees other than triangle binary trees could be used and any such shape could be likewise traced up to the original large shape.

When a triangle binary tree is used to represent a square terrain patch or a polygon terrain mesh, sometimes three points are connected that are not necessarily close together. That is to say that a larger triangle of only three data points is used to represent more terrain data points enclosed by the triangle. This introduces certain errors in representation. The error bound array characterizes the levels of errors introduced when triangles of different sizes are used. When the smallest triangles are used, the errors will approach zero.

In the instant invention, methods are provided to produce situation-dependent lateral terrain maps using a triangle mesh or other convenient structure. When an area of terrain is to be presented, a quantitative measure is computed to characterize ruggedness of the terrain area. This measure is then combined with the above-described display situation to determine combined parameters to perform proper terrain shading. When terrain features must be accentuated in situations such as terrain warnings, the combined parameters would enhance terrain features for quick threat envelope identification. When terrain is to be used as a background for other navigation and flight planning applications, the relief features are set such as to augment current flight and navigation information, that is, the relief features are de-emphasized. Different terrain feature enhancement levels may be applied in different regions on the lateral map. For example, the terrain features will be enhanced in areas of potential conflict with a planned path, and other areas are used primarily as background for planning and navigation related activities.

Figure 2A:
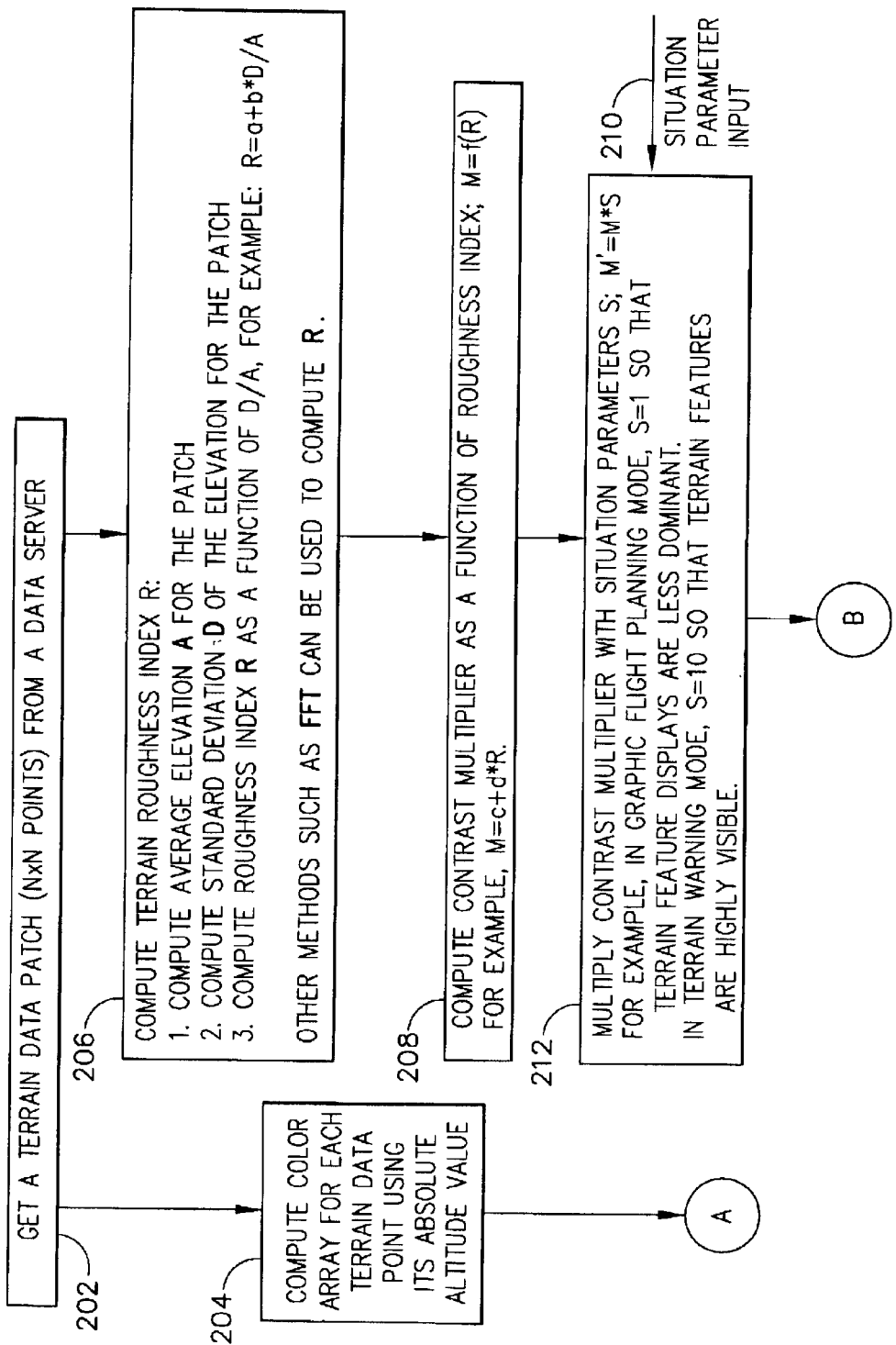
FIG. 2 is a flow diagram describing how the flight management system produces the display format of the invention.
Figure 2B:
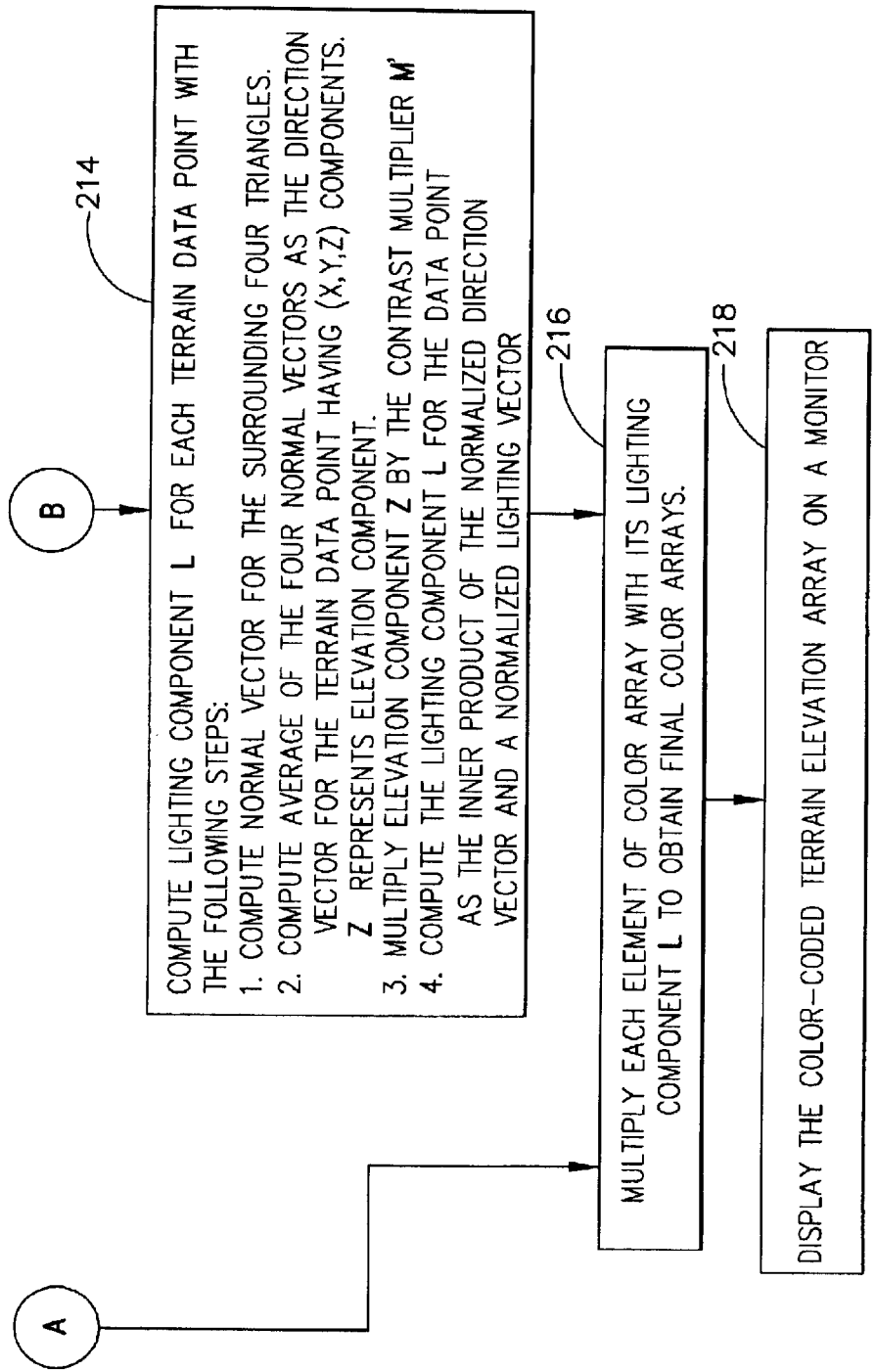

FIG. 2 is a flow diagram describing how the flight management system, and particularly the graphics processor 102 of FIG. 1, produces the display format of the invention. In this example, triangle meshes are again used to construct the terrain map, it being understood that other variants, as above, could be used. It is also understood that instead of terrain elevation data from the terrain database 106, the data being operated upon could be, for example weather data from a weather data source 108.

The process of the flow chart of FIG. 2 begins with the retrieval 202 of terrain data from terrain database 106 or from another similar database that may be on-board the aircraft or accessed remotely. The terrain data, in this preferred embodiment might be a terrain data patch, as described above, of N×N points. The terrain data is used to compute (204) a color array for each terrain data point using the absolute altitude value. This color array may be conventionally based on potential threat terrain in various colors depending on the level of threat: red for warnings (immediate danger), yellow for cautions (possible danger), and green for terrain that is not a threat Of course, other colors and different numbers of levels of threat can be provided as a matter of choice.

The terrain data is also used to compute a situation-dependent parameter to modify the color array 204 to enhance or de-emphasize terrain features in the ultimate terrain display. This parameter is obtained by first computing a terrain roughness index R (206). This computation can be performed in several ways, but in this preferred embodiment it is obtained by: i) computing an average elevation A for the data patch; ii) computing the standard deviation D of the elevation for the data patch; and iii) computing the roughness index as a function of D/A. For example: $R=a+b*D/A$, where a and b are arbitrarily obtained constants derived from experimental data. Different display devices may have different characteristics, and the a and b constants are selected to accommodate those differences. Other methods may be used to calculate a roughness index, for example, the index may be calculated using a Fast Fourier Transform. A Fast Fourier Transform provides information about the amount of variation in a data patch. If the data are flat, the transform will be a constant. Otherwise the Transform will output numbers corresponding to the extent of the variation from flat of the data patch. A two-dimensional Fast Fourier Transform analysis, however, uses more computational power than the calculation noted above.

After calculating a roughness index R, a contrast multiplier M is computed (208) as a function of the roughness index ($M=f(R)$), for example, $M=c+d*R$, where c and d are constants derived from experimental data to allow for variations in display characteristics or the like. This calculation of a contrast multiplier by itself would allow the display to accommodate widely varying terrain displays while using reasonable computational assets (i.e., the graphics processor is limited at some level in throughput, so a reduction in processing workload will allow the maintenance of reasonable throughput while reducing the level of contrast of the display when extremely sharp detail is not necessary). But there are occasions when emphasis of terrain features becomes highly important, such as if the aircraft is headed into elevated terrain. From this calculation the contrast of the display is modified since higher values of contrast multiplier result in higher contrast on the display.

Figure 3:
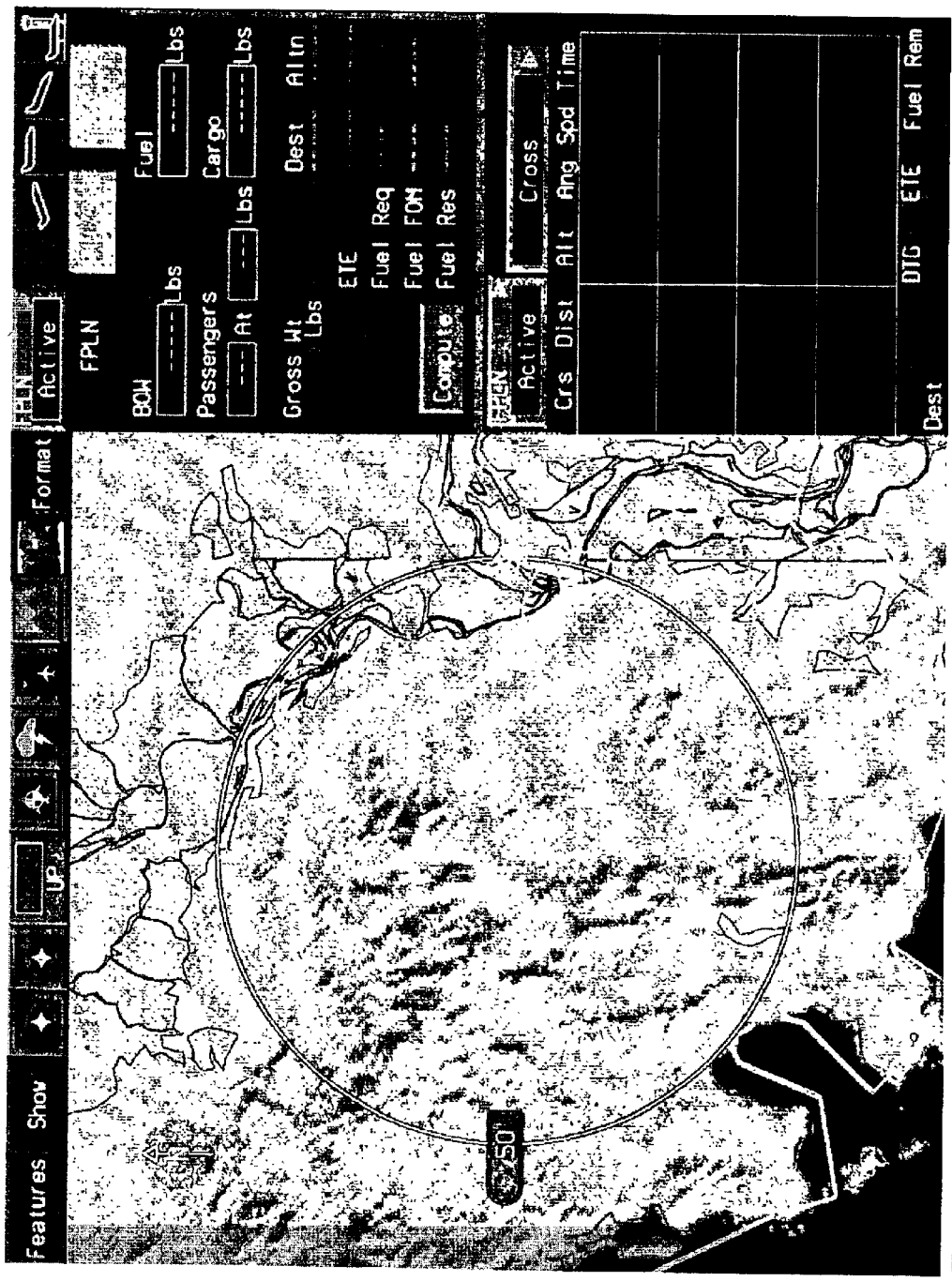
FIG. 3 is a scanned image of an avionics display wherein the terrain features of an area are displayed with a relatively higher contrast multiplier.
Figure 4:
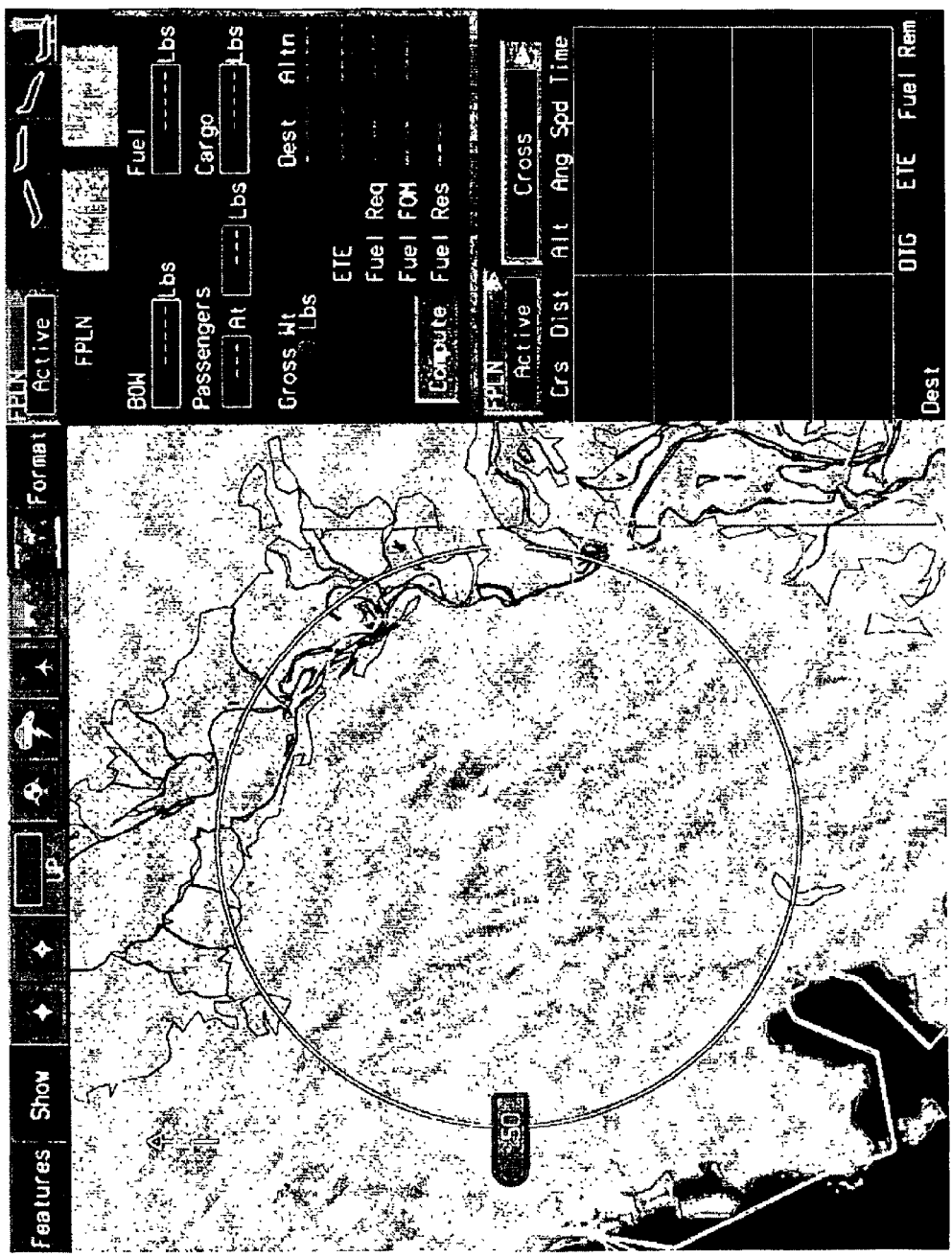
FIG. 4 is a scanned image of an avionics display wherein the terrain features of the same area as that of FIG. 3 are displayed with a relatively lower contrast multiplier.

FIG. 3 and FIG. 4 are illustrative of the effect of the contrast multiplier M on a typical display. FIG. 3 and FIG. 4 both show a scanned image of an avionics display of the same area of terrain with different contrast multipliers applied. In FIG. 3, the ruggedness index of the area is 170 and the contrast multiplier selected is 14.3. The hilly areas depicted on the display are very contrasty. In FIG. 4, the ruggedness index is 170, of course, this being the same area as in FIG. 3, but the contrast multiplier is 4.0. The hilly areas (subjectively) appear to be well balanced.

Returning to FIG. 2, a situation parameter 210 is obtained, which is dependent upon the functions that the aircrew desires to perform using the display: flight-planning, terrain warning threats, and other parameters of interest in conduct of the flight. Since the situation parameter will be used in conjunction with the contrast multiplier to modify the shading, and thereby the contrast, of the terrain display representation, the situation parameter may have a range of values. For example, under the conditions that the aircrew selects a graphic flight-planning mode of operation, the situation parameter S would be a relatively low value selected to have an impact on the ultimate display such that the terrain features are de-emphasized and are thus less dominant in the view presented to the aircrew. In the event of a terrain warning from, for example, the Terrain Avoidance and Warning System 110 (FIG. 1), however, the situation parameter would be selected at a higher value such that terrain features are highly emphasized in order to draw the terrain danger to the attention of the aircrew. Thus the situation parameter S is used as a multiplier (or other functional modifier) of the contrast multiplier, $M'=M*S$.

The situation parameter S may be derived from several sources. A preliminary situation parameter may be selected based on aircrew input. If the aircrew selects a flight-planning mode for the display, terrain features may be de-emphasized in order to highlight those items useful in planning a flight, such as airport symbols, navigational information, and the like. If, in the process of retrieving data points for the next section of terrain to be displayed the graphics processing unit 102 determines that at the aircraft's present altitude and heading the aircraft is approaching a dangerous situation, the graphics processor, upon receiving a signal sent by the terrain avoidance and warning system, may provide a higher situation parameter input to the modified contrast multiplier calculation (212). Likewise, if the aircrew selects a weather mode for the display, terrain features may be de-emphasized in order to highlight those weather features potentially affecting a flight, such as thunderstorms, light or heavy precipitation, and the like. If, in the process of retrieving weather data for the next section of terrain to be displayed, the graphics processing unit 102 determines that at the aircraft's present heading the aircraft is approaching a dangerous situation, the graphics processor may provide a higher situation parameter input to the modified contrast multiplier calculation (212).

Having now derived a modified contrast multiplier M', a lighting or shading component L may be determined for each data point that will ultimately lead to the appropriate lighting or shading of the color array (204). The lighting component is computed (214) for each terrain data point as follows: i.) a normal vector is computed for each of the four triangles surrounding the terrain data point; ii.) the average of the four normal vectors is computed as the direction vector for the terrain data point having (X,Y,Z) components, where Z is the elevation component; iii.) the elevation component Z is multiplied by the modified contrast multiplier M'; iv.) the lighting component L is computed for the data point as the inner product of the normalized direction vector and a normalized lighting vector.

Each element of the computed color array (204) is multiplied by its lighting component L (214) to obtain the final color-coded terrain elevation arrays. The lighting component L is thus used to obtain a light/shading component to modulate the intensity of the computed color array (204).

Finally, the color-coded terrain elevation arrays are displayed on the Display 104 of FIG. 1.

Figure 5:
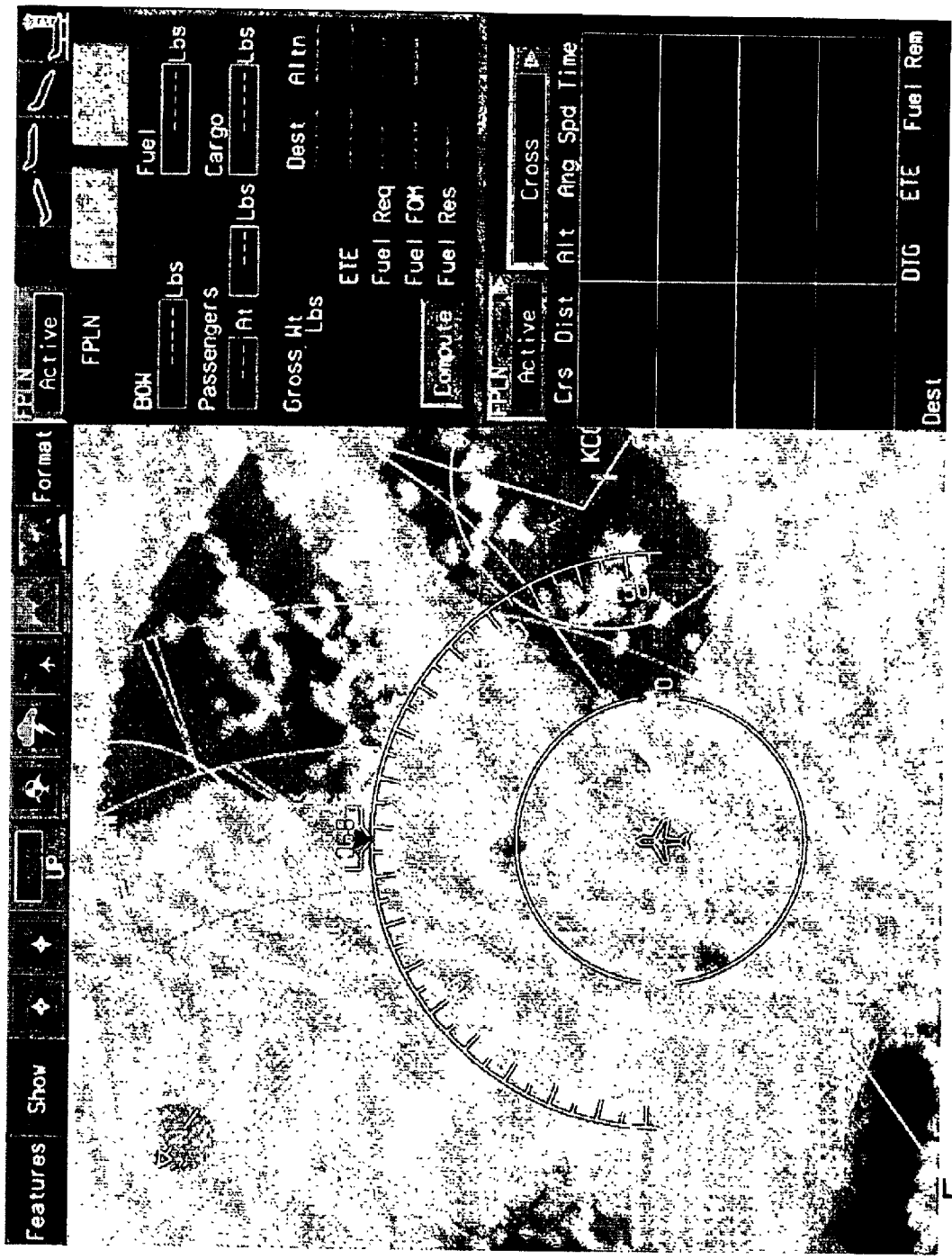
FIG. 5 is a scanned image of an avionics display wherein terrain caution and warning features in an area are shown with a relatively high contrast multiplier.

FIG. 5 is a scanned image of an avionics display wherein terrain warning features in an area are shown with a relatively high contrast multiplier. The computations for the data for such a display are similar to those of FIG. 2. FIG. 5 depicts an area having a roughness index of 48 and a contrast multiplier of 35.1. In this depiction the terrain features are more enhanced and thus the threat areas are more prominent.

Figure 6:
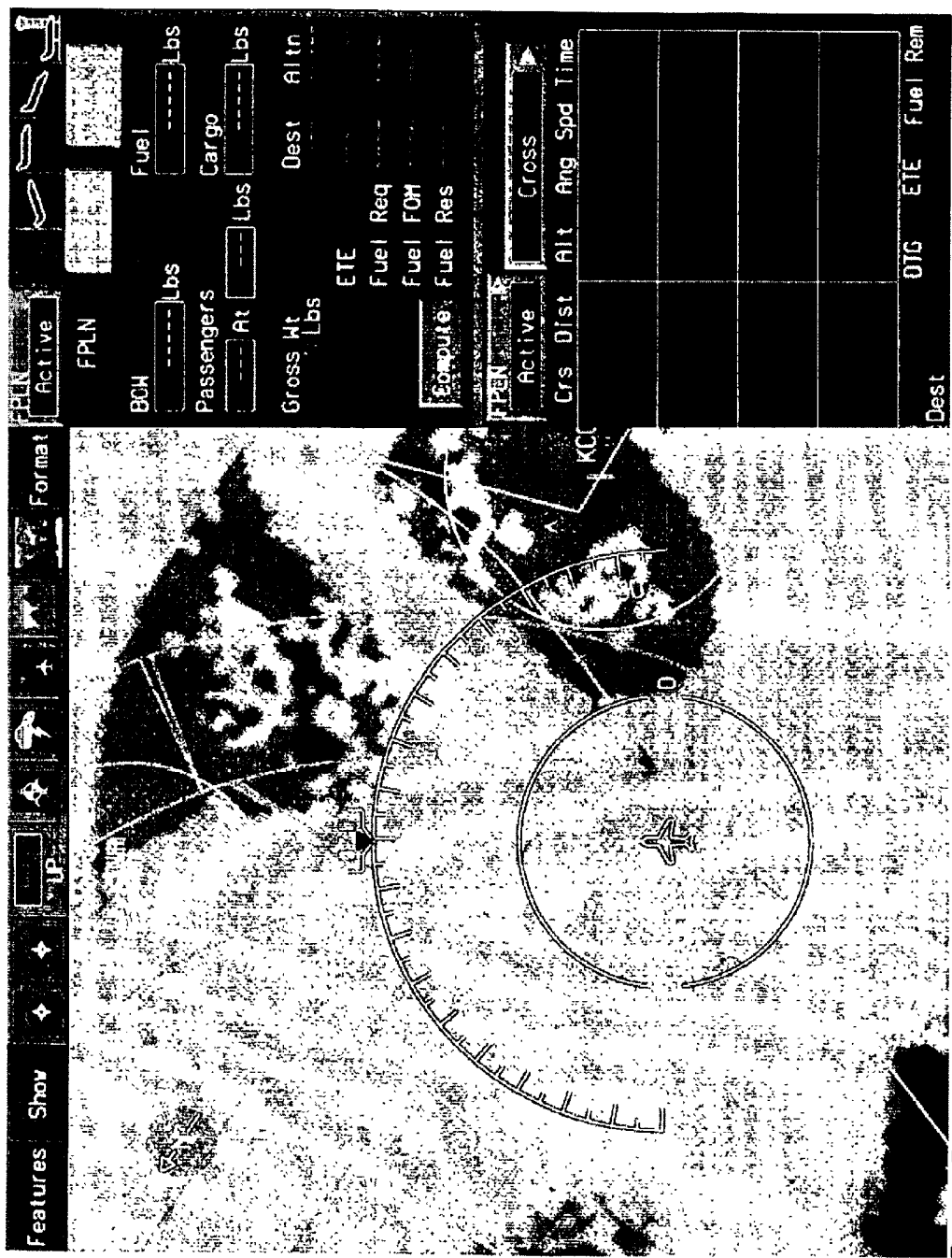
FIG. 6 is a scanned image of an avionics display wherein terrain caution and warning features in the same area as in FIG. 5 are shown with a relatively lower contrast multiplier.

FIG. 6 is a scanned image of an avionics display wherein terrain features in the same area as in FIG. 5, but with a relatively lower contrast multiplier. In this case the features are not as prominent as those of FIG. 5.

While the invention has been described in terms related to the preferred embodiment disclosed herein, it will become apparent to those skilled in the art that modifications may be made which however remain within the scope of the appended claims.

What is claimed is:

1. A method for adapting an aircraft terrain display in response to situational parameters, the display comprising one more patches of terrain data comprising a plurality of terrain data points:

computing a terrain roughness parameter to characterize terrain roughness for an area of terrain to be displayed;

computing a color array having one or more elements for each of the terrain data points;

computing a contrast multiplier as a function of the terrain roughness parameter;

multiplying the contrast multiplier by a situation parameter that varies depending upon the flight mode of the aircraft to determine a situation contrast multiplier, computing a lighting component using the situation contrast multiplier for each of the terrain data points;

multiplying the lighting component for each of the terrain data points by each element of the color array to obtain a set of display terrain data to be displayed; and displaying the display terrain data on the display.

2. A method as set forth in claim 1 wherein the terrain is displayed in color representing the altitude of each of the terrain data points.

3. A method as set forth in claim 2 wherein the color of the terrain displayed is modified as a function of the lighting component.

4. A method as set forth in claim 1 wherein terrain roughness is calculated by computing an average elevation of each of the terrain data points in the area of terrain to be displayed, computing the standard deviation of the average elevation of each of the terrain data points, and computing a roughness index as a function of the standard deviation and the average elevation.

5. A method as set forth in claim 1 wherein terrain roughness is calculated by using a Fast Fourier Transform.

6. A method as set forth in claim 1 wherein the lighting component for each of the terrain data points is computed by;

computing a normal vector for a set of polygons surrounding each of the terrain data points; computing the average of the set of normal vectors;

multiplying the elevation of each of the terrain data points by the contrast multiplier; and computing the lighting component of a each terrain data point as a function of the normalized vector and a normalized lighting vector.

7. A method as set forth in claim 6 wherein the lighting component is the inner product of the normalized vector and a normalized lighting vector.

8. In a display for displaying terrain features in conjunction with non-terrain features, wherein features may be enhanced or de-emphasized as a function of a situation external to a display, the method comprising:

retrieving a set of data points representing the location and elevation of terrain in an area of terrain to be displayed;

computing a color of each data point as a function of the elevation of the terrain at the data point;

calculating a desired contrast of each data point as a function of the situation;

modifying the color of each data point as a function of the desired contrast; and displaying the modified color of each data point on the display.

9. A method as set forth in claim 8 wherein the display is an avionics display for an aircraft and the terrain is represented as a terrain map.

10. A method as set forth in claim 9 wherein the display also displays graphical flight planning information.

11. A method as set forth in claim 10 wherein the color of each data point signifies the elevation of the terrain above or below the altitude of the aircraft.

12. A method as set forth in claim 11 wherein if the aircraft is at an altitude equal to or lower than the elevation of the immediate terrain, the terrain map is enhanced and the graphical flight planning data is de-emphasized.

* * * * *